US011667166B2

(12) United States Patent
Li

(10) Patent No.: US 11,667,166 B2
(45) Date of Patent: Jun. 6, 2023

(54) ALL-TERRAIN VEHICLE

(71) Applicant: SEGWAY TECHNOLOGY CO., LTD., Changzhou (CN)

(72) Inventor: Xiang Li, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 0 days.

(21) Appl. No.: 17/584,609

(22) Filed: Jan. 26, 2022

(65) Prior Publication Data
US 2022/0234404 A1 Jul. 28, 2022

(30) Foreign Application Priority Data

Jan. 27, 2021 (CN) .......................... 202110114000.4
Jan. 27, 2021 (CN) .......................... 202110114004.2
Jan. 27, 2021 (CN) .......................... 202120234516.8

(51) Int. Cl.
*B60G 3/20* (2006.01)
*B60G 7/00* (2006.01)
(Continued)

(52) U.S. Cl.
CPC ............... *B60G 3/20* (2013.01); *B60G 7/001* (2013.01); *B62D 21/02* (2013.01); *B62D 21/11* (2013.01)

(58) Field of Classification Search
CPC ..... B60G 7/001; B60G 2206/10; B62D 21/02
See application file for complete search history.

(56) References Cited

U.S. PATENT DOCUMENTS 7,278,648 B2 10/2007 Bobbitt et al.
7,347,490 B2 * 3/2008 Kobayashi ......... B62D 25/2009
296/63
(Continued)

FOREIGN PATENT DOCUMENTS

CN 203472446 U 3/2014
CN 203739564 U 7/2014
(Continued)

OTHER PUBLICATIONS

Computer-generated English translation of Chinese Patent Publications CN211543691U to Beijing Zhixingmuyuan Tech (Year: 2022).*
(Continued)

*Primary Examiner* — Drew J Brown
*Assistant Examiner* — Tiffany L Webb
(74) *Attorney, Agent, or Firm* — Frost Brown Todd LLP

(57) ABSTRACT

An all-terrain vehicle includes a frame, a transmission, an axle support, a driving shaft and a rear suspension assembly. The transmission is mounted on the frame. The driving shaft is coupled between the transmission and the axle support. The rear suspension assembly includes left and right rear suspension subassemblies symmetrically arranged at left and right sides of the frame. Each of the left and right rear suspension subassemblies includes an upper control min and a lower control arm, the upper control arm has a first end pivotally coupled to the frame and a second end pivotally coupled to the axle support, the lower control arm has a first end pivotally coupled to the frame and a second end pivotally coupled to the axle support, and a junction of the first end of the upper control arm and the frame is located behind the driving shaft.

17 Claims, 4 Drawing Sheets

(51) Int. Cl.
*B62D 21/11* (2006.01)
*B62D 21/02* (2006.01)

(56) References Cited

U.S. PATENT DOCUMENTS

| | | | | |
|---|---|---|---|---|
| 7,896,371 | B2 * | 3/2011 | Matsuura | B62K 5/01 |
| | | | | 180/311 |
| 8,509,938 | B2 | 8/2013 | King | |
| 8,596,405 | B2 * | 12/2013 | Sunsdahl | B62D 21/183 |
| | | | | 180/312 |
| 8,827,028 | B2 * | 9/2014 | Sunsdahl | B60K 5/00 |
| 8,997,908 | B2 * | 4/2015 | Kinsman | B62D 21/183 |
| | | | | 296/202 |
| 9,849,743 | B2 * | 12/2017 | Kuwabara | B60G 7/001 |
| 9,944,177 | B2 * | 4/2018 | Fischer | B60K 11/06 |
| 10,207,554 | B2 * | 2/2019 | Schroeder | B60G 7/005 |
| 10,780,754 | B2 * | 9/2020 | Ye | B60G 7/001 |
| 2018/0326843 | A1 * | 11/2018 | Danielson | B60G 15/062 |
| 2020/0398625 | A1 * | 12/2020 | Han | B60G 13/003 |

FOREIGN PATENT DOCUMENTS

| | | | |
|---|---|---|---|
| CN | 105142938 A | 12/2015 | |
| CN | 109733151 A | 5/2019 | |
| CN | 109843612 A | 6/2019 | |
| CN | 209479340 U | 4/2020 | |
| CN | 210309803 U | 4/2020 | |
| CN | 210309812 U | 4/2020 | |
| CN | 210391299 U | 4/2020 | |
| CN | 211543691 U | 9/2020 | |
| CN | 211685323 U | 10/2020 | |
| CN | 111890861 A | 11/2020 | |
| CN | 112722083 A | 4/2021 | |
| CN | 215155024 U | 12/2021 | |
| CN | 215553557 U | 1/2022 | |

OTHER PUBLICATIONS

Chinese Office Action dated Aug. 3, 2022 for Application No. 202110114000.4, 26 pages.
Chinese Office Action dated Aug. 3, 2022 for Application No. 202110114004.2, 13 pages.
Chinese Office Action dated Feb. 16, 2023 for Application No. 202110114000.2, 18 pages.

* cited by examiner

LEFT ← → RIGHT

US 11,667,166 B2

ALL-TERRAIN VEHICLE

CROSS-REFERENCE TO RELATED APPLICATIONS

This application claims priority to and benefits of Chinese Patent Application Serial No. 202110114004.2, filed on Jan. 27, 2021, Chinese Patent Application Serial No. 202110114000.4, filed on Jan. 27, 2021, and Chinese Patent Application Serial No. 202120234516.8, filed on Jan. 27, 2021, the entire contents of which are incorporated herein by reference.

FIELD

The present disclosure relates to the field of vehicle technologies, and more particularly, to an all-terrain vehicle.

BACKGROUND

All-terrain vehicles, also known as all-terrain four-wheeled off-road motorcycles, are simple and utility and have good off-road performance. In related art, taking into account off-road performance and the trafficability of the vehicles, suspension systems of the all-terrain vehicles typically employ double wishbone structure.

SUMMARY

An all-terrain vehicle according to embodiments of the present disclosure includes a frame, a transmission, an axle support, a driving shaft and a rear suspension assembly. The transmission is mounted on the frame. The driving shaft is coupled between the transmission and the axle support. The rear suspension assembly includes a left rear suspension subassembly and a right rear suspension subassembly symmetrically arranged at left and right sides of the frame. Each of the left rear suspension subassembly and the right rear suspension subassembly includes an upper control arm and a lower control arm, the upper control arm has a first end pivotally coupled to the frame and a second end pivotally coupled to the axle support, the lower control arm has a first end pivotally coupled to the frame and a second end pivotally coupled to the axle support, and a junction of the first end of the upper control arm and the frame is located behind the driving shaft. The first end of the upper control arm is pivotally coupled to the frame by a single first upper pivot.

An all-terrain vehicle according to embodiments of the present disclosure includes a frame, a stabilization rod mounting member, a transmission, an axle support, a driving shaft and a rear suspension assembly. The stabilization rod mounting member is mounted to a rear portion of the frame. The transmission is mounted on the frame. The driving shaft is arranged between the transmission and the axle support. The rear suspension assembly includes a left rear suspension subassembly and a right rear suspension subassembly symmetrically arranged at left and right sides of the frame, each of the left rear suspension subassembly and the right rear suspension subassembly includes an upper control arm, a lower control arm and a first upper pivot. The upper control arm has a first end pivotally coupled to the frame and a second end pivotally coupled to the axle support, the lower control arm has a first end pivotally coupled to the frame and a second end pivotally coupled to the axle support, and a junction of the first end of the upper control arm and the frame is located behind the driving shaft. The first upper pivot passes through an upper portion of the stabilization rod mounting member, the frame and the first end of the upper control arm, to couple the upper portion of the stabilization rod mounting member to the frame and pivotally couple the first end of the upper control arm to the frame.

Figure 1:
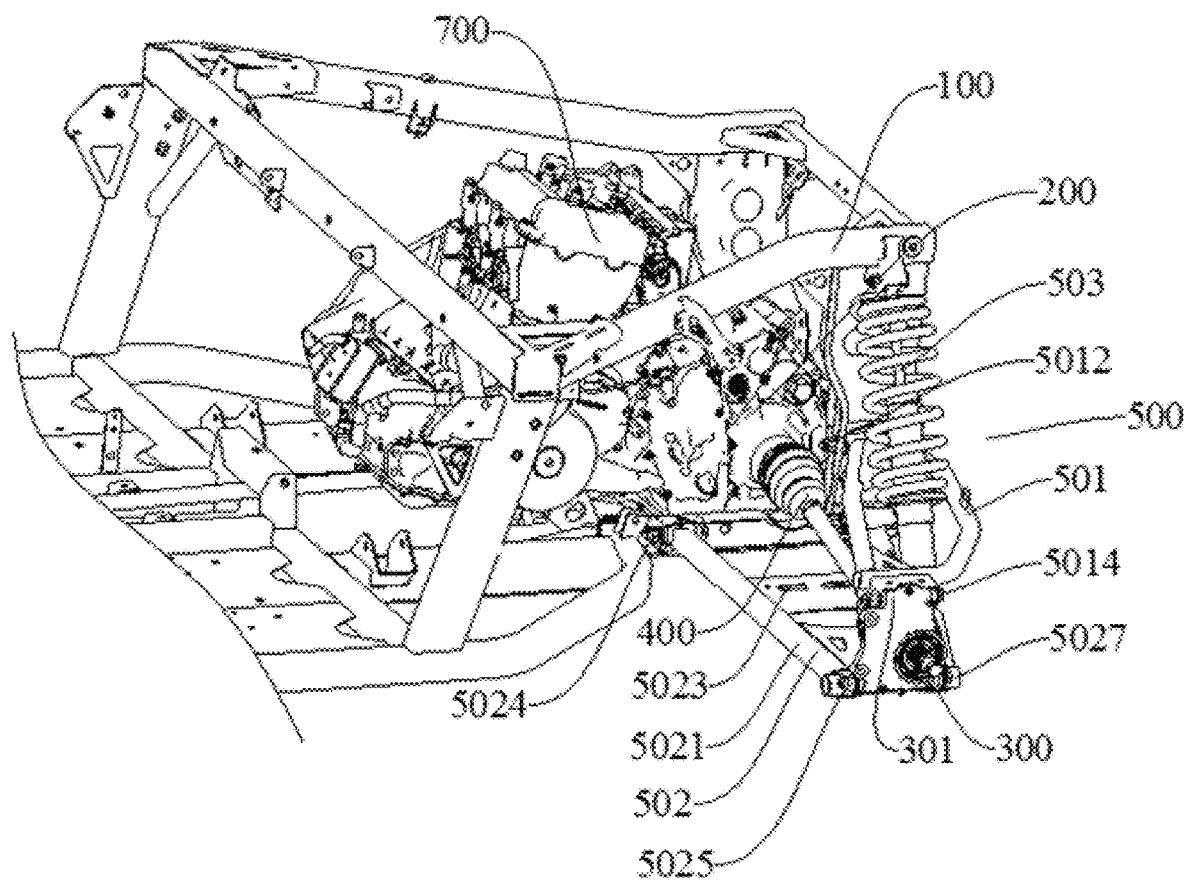
FIG. 1 is a partial schematic view of an all-terrain vehicle according to an embodiment of the present disclosure from a perspective.

REFERENCE NUMERALS 100, frame; 110, rear vertical beam; 111, front side flange; 112, rear side flange; 120, mounting groove;
200, transmission;
300, axle support; 301, mounting portion;
400, driving shaft;
500, rear suspension assembly; 510, left rear suspension subassembly; 520, right rear suspension subassembly;
501, upper control arm; 5011, coupling pipe; 5012, first upper pivot; 5013, coupling seat; 50131, front side plate; 50132, rear side plate; 5014, second upper pivot; 5015, first sub arm; 5016, second sub arm; 5017, cross arm; 5018, reinforcing plate; 50181, lightening hole;
502, lower control arm; 5021, lower front arm rod; 5022, lower rear arm rod; 5023, coupling cross beam; 5024, first lower front pivot; 5025, second lower front pivot; 5026, first lower rear pivot; 5027, second lower rear pivot; 503, damper;
600, stabilization assembly; 601, stabilization rod; 6011, cross rod; 6012, first longitudinal rod; 6013, second longitudinal rod; 602, first coupling rod; 603, second coupling rod; 604, fixed seat; 605, limit cavity; 606, sleeve;
700, engine; 800, stabilization rod mounting member.

BRIEF DESCRIPTION OF THE DRAWINGS

Embodiments of the present disclosure will be described in detail below, and examples of the embodiments are shown in accompanying drawings. The embodiments described herein with reference to drawings are explanatory, illustrative, and used to generally understand the present disclosure. The embodiments shall not be construed to limit the present disclosure.

The suspension systems having a double wishbone structure have large size, occupy large space in the frame, and parameter design of the suspension systems are greatly restricted. Thus, optimization of the suspension parameters is restricted. The present disclosure seeks to solve at least one of the problems existing in the related art to at least some extent. To this end, embodiments of the present disclosure propose an all-terrain vehicle, which has compact structure and facilitates optimization of suspension parameters.

As illustrated in FIGS. 1 to 6, an all-terrain vehicle according to embodiments of the present disclosure includes a frame 100, a transmission 200, an axle support 300, a driving shaft 400 and a rear suspension assembly 500.

The transmission 200 is mounted on the frame 100, and the driving shaft 400 is coupled between the transmission 200 and the axle support 300. The rear suspension assembly 500 includes a left rear suspension subassembly 510 and a right rear suspension subassembly 520. The left rear suspension subassembly 510 and the right rear suspension subassembly 520 are symmetrically arranged at left and right sides of the frame 100.

Figure 2:
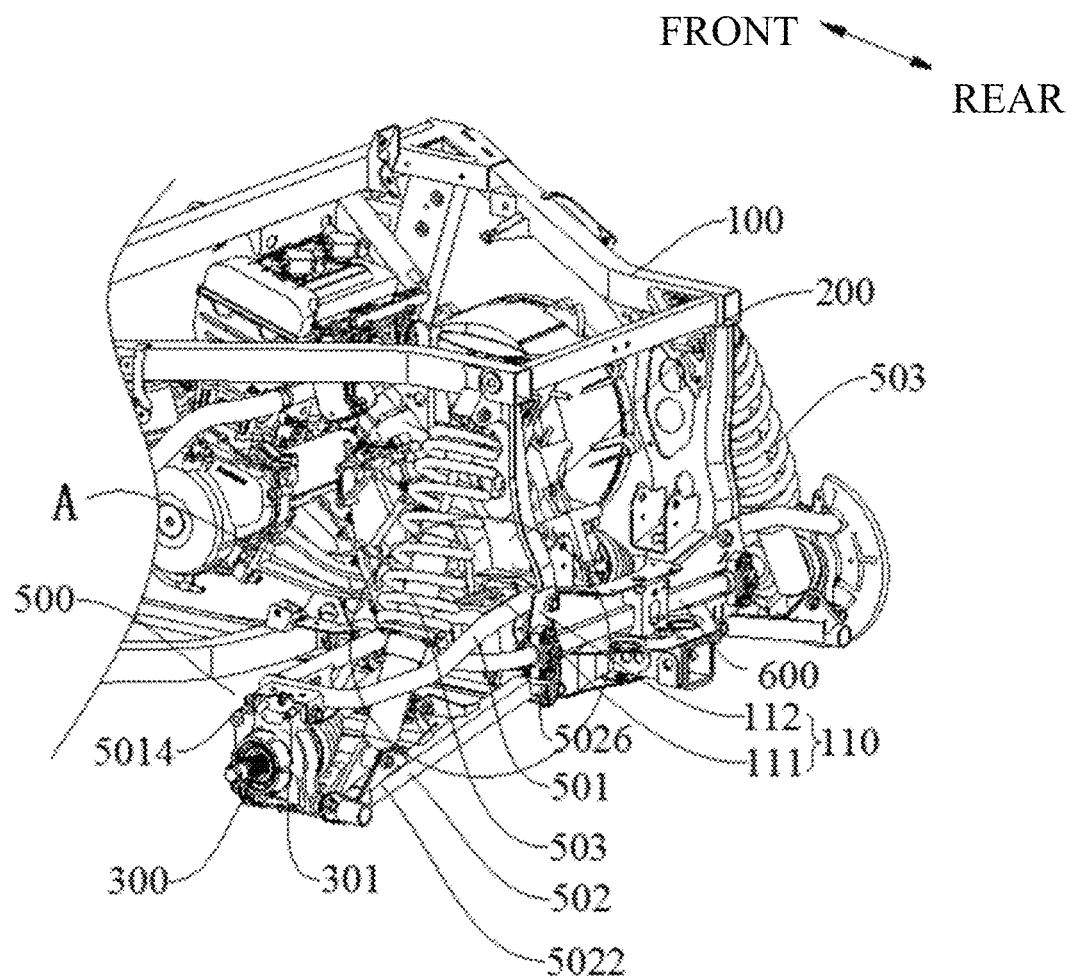
FIG. 2 is a partial schematic view of an all-terrain vehicle according to an embodiment of the present disclosure from another perspective.
Figure 3:
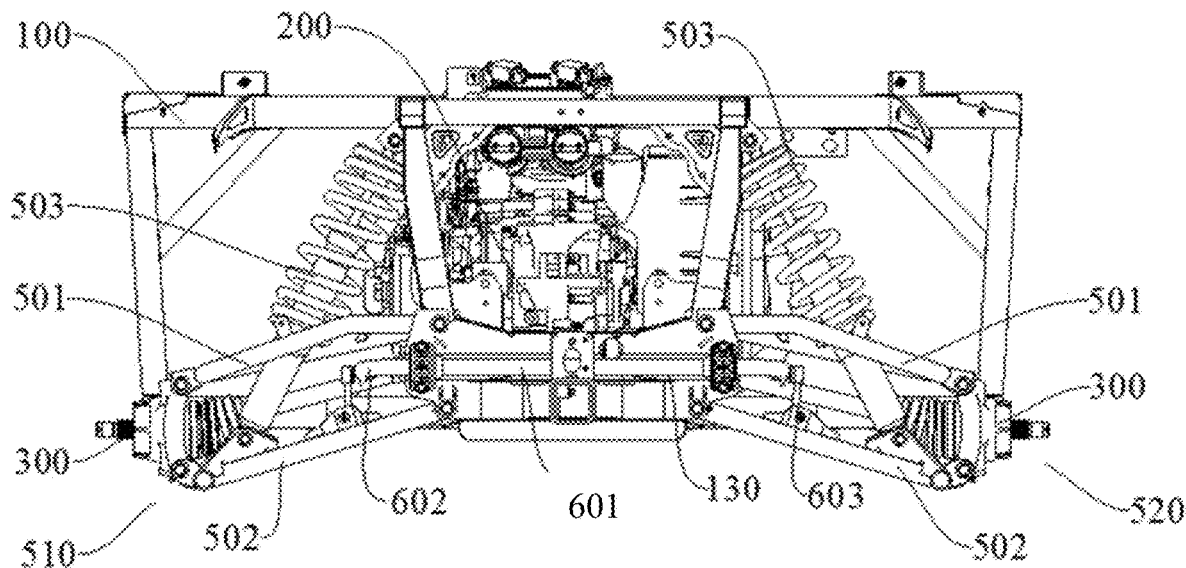
FIG. 3 is a rear view of an all-terrain vehicle according to an embodiment of the present disclosure.

As illustrated in FIGS. 1 to 3 and 6, each of the left rear suspension subassembly 510 and the right rear suspension subassembly 520 includes an upper control arm 501 and a lower control arm 502. A first end of the upper control arm 501 (an end of the upper control arm 501 adjacent to the frame 100 as illustrated in FIG. 3) is pivotally coupled to the frame 100, and a second end of the upper control arm 501 (an end of the upper control arm 501 adjacent to the axle support 300 as illustrated in FIG. 3) is pivotally coupled to the axle support 300. A first end of the lower control arm 502 (an end of the lower control arm 502 adjacent to the frame 100 as illustrated in FIG. 3) is pivotally coupled to the frame 100, and a second end of the lower control arm 502 (an end of the lower control arm 502 adjacent to the axle support 300 as illustrated in FIG. 3) is pivotally coupled to the axle support 300. A junction between the first end of the upper control arm 501 and the frame 100 is located behind the driving shaft 400, and the first end of the upper control arm 501 is pivotally coupled to the frame 100 by a single first upper pivot 5012.

In the all-terrain vehicle according to embodiments of the present disclosure, the junction between the end of the upper control arm 501 adjacent to the frame 100 and the frame 100 is located behind the driving shaft 400, thus compactness of structure of the all-terrain vehicle can be improved, utilization of internal space of the all-terrain vehicle can be improved, and optimization of suspension parameters of the all-terrain vehicle can be facilitated; the first end of the upper control arm 501 is pivotally coupled to the frame 100 by the single first upper pivot 5012, thus mounting sizes of the upper control arm 501 and the frame 100 can be reduced, the volume of the rear suspension assembly 500 can be reduced, the structure of the all-terrain vehicle can be made compact, the utilization of the internal space of the all-terrain vehicle can be improved; and the first end of the upper control arm 501 is coupled to the frame 100 by the single pivot, thus stability of the coupling between the upper control arm 501 and the frame 100 can be enhanced.

Further, as illustrated in FIGS. 1 and 2, the first end of the upper control arm 501 is coupled to the frame 100 by the first upper pivot 5012, a front end of the first upper pivot 5012 is located behind the driving shaft 400, and a rear end of the first upper pivot 5012 is located behind the transmission 200. In other words, the first end of the upper control arm 501 and the frame 100 have front and rear mounting points, the front mounting point is located at a rear side of the driving shaft 400, and the rear mounting point is located at a rear side of the transmission 200. Thus, compactness of structure of the all-terrain vehicle according to embodiments of the present disclosure can be further improved, space surrounding the engine 700 and the transmission 200 can be fully utilized, and mounting points of the upper control arm 501 and the frame 100 can be closer to the center of the frame 100. That is, in case of a certain wheelbase of the all-terrain vehicle, the length of the upper control arm 501 is lengthened, facilitating control and optimization of the suspension parameters.

Figure 5:
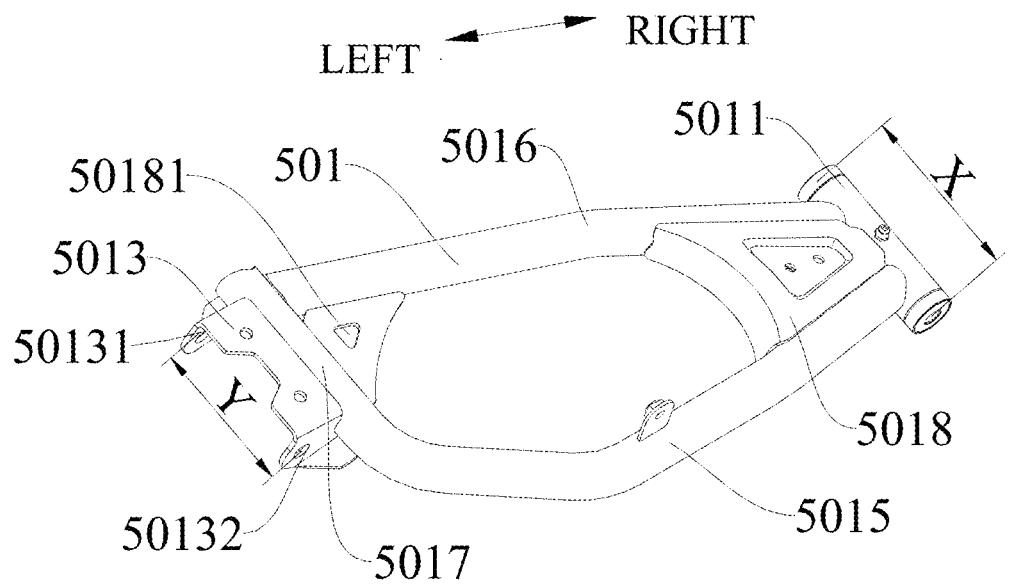
FIG. 5 is a schematic view of an upper control arm of an all-terrain vehicle according to an embodiment of the present disclosure.

In at least one embodiment, as illustrated in FIGS. 1 and 5, the first end of the upper control arm 501 (a right end of the upper control arm 501 as illustrated in FIG. 5) has a coupling pipe 5011, the first upper pivot 5012 is pivotally fitted in the coupling pipe 5011, a front end of the first upper pivot 5012 extends out from the coupling pipe 5011 and is coupled to the frame 100, and a rear end of the first upper pivot 5012 extends out from the coupling pipe 5011 and is coupled to the frame 100.

An axis of the first upper pivot 5012 is parallel to a longitudinal central symmetry plane of the all-terrain vehicle. In at least one embodiment, the axis of the first upper pivot 5012 is parallel to a front-rear direction of the all-terrain vehicle, thus stress on the first upper pivot 5012 can be more reasonable, and stability of the coupling between the upper control arm 501 and the frame 100 can be further enhanced.

Figure 6:
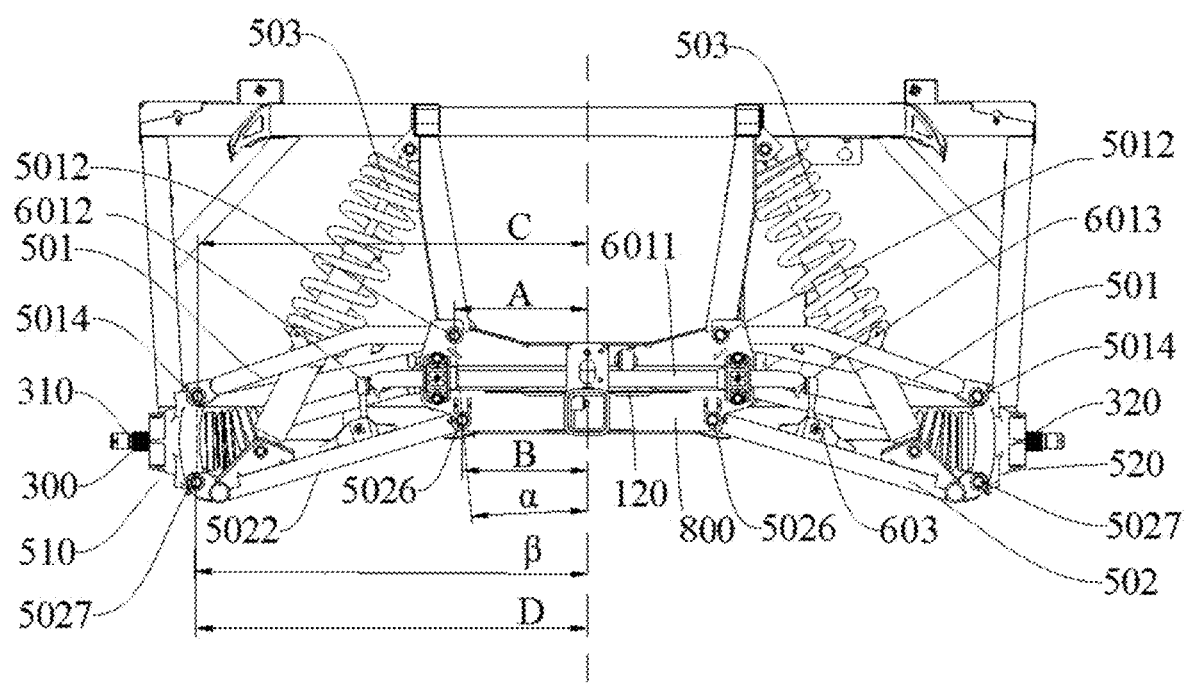
FIG. 6 is a coupling schematic view of a rear suspension assembly of an all-terrain vehicle according to an embodiment of the present disclosure.

For example, as illustrated in FIGS. 1, 2 and 6, a rear portion of the frame 100 is coupled with a rear vertical beam 110. The rear vertical beam 110 includes a front side flange 111 and a rear side flange 112. The first upper pivot 5012 may be a bolt, the front end of the first upper pivot 5012 passes through the front side flange 111 and the rear side flange 112 and is fitted with a fastening nut. It could be understood that, when the first end of the upper control arm 501 needs to be mounted onto the frame 100, the front end of the first upper pivot 5012 may pass through the front side flange 111, the coupling pipe 5011 and the rear side flange 112 sequentially, and the first upper pivot 5012 is fastened by the fastening nut, to avoid looseness of the upper control arm 501 and the frame 100, facilitating mounting and detachment of the all-terrain vehicle.

In some embodiments, as illustrated in FIGS. 1 and 5, the second end of the upper control arm 501 (a left end of the upper control arm 501 as illustrated in FIG. 5) is provided with a coupling seat 5013 having a substantially inverted U shape, the axle support 300 is provided with a mounting portion 301, and the mounting portion 301 is fitted in the coupling seat 5013 and pivotally coupled by a second upper pivot 5014.

In at least one embodiment, as illustrated in FIGS. 1 and 5, the coupling seat 5013 includes a front side plate 50131 and a rear side plate 50132. The front side plate 50131 defines a front coupling hole, and the rear side plate 50132 defines a rear coupling hole. The second upper pivot 5014 is a bolt, and the second upper pivot 5014 passes through the front coupling hole, the mounting portion 301 and the rear coupling hole and is fitted with the fastening nut. When the second end of the upper control arm 501 needs to be mounted onto the axle support 300, the front end of the second upper pivot 5014 may pass through the front side plate 50131, the mounting portion 301 and the rear side plate 50132 sequentially, and then the second upper pivot 5014 may be fastened by the fastening nut, to avoid looseness of the upper control arm 501 and the axle support 300, facilitating mounting and detachment of the all-terrain vehicle.

In some embodiments, as illustrated in FIG. 5, the upper control arm 501 forms a closed frame. For example, the upper control arm 501 may be a rectangle-like closed frame structure enclosed by pipes, to enhance structural strength of the upper control arm 501, prolong service life of the rear suspension assembly 500, and improve stability of travelling of the all-terrain vehicle.

Further, as illustrated in FIG. 5, a length X of the coupling pipe 5011 is greater than a distance Y between the front side plate 50131 and the rear side plate 50132. It could be understood that, as illustrated in FIG. 5, a width of the right end of the upper control arm 501 is greater than a width of the left end of the upper control arm 501. In other words, the width of the end of the upper control arm 501 adjacent to the frame 100 is greater than the width of the end of the upper control arm 501 away from the frame 100. Thus, the stress on the upper control arm 501 can be reasonable, and the stability of the travelling of the all-terrain vehicle can be further improved.

In some embodiments, as illustrated in FIGS. 1-3 and 6, the rear suspension assembly 500 further includes a damper 503. The damper 503 is located behind the driving shaft 400. An upper end of the damper 503 is pivotally coupled to the frame 100, and a lower end of the damper 503 passes through a middle portion of the upper control arm 501 and is pivotally coupled to the lower control arm 502. It could be understood that, the lower end of the damper 503 passes through the middle portion of the upper control arm 501 from the lower control arm 502, the length of the damper 503 can be lengthened, and compressible stroke of the damper 503 can be longer. Thus, up and down stoke of a wheel may be longer, and comfort of travelling of the all-terrain vehicle can be improved.

In some embodiments, as illustrated in FIGS. 1, 2 and 6, the lower control arm 502 includes a lower front arm rod 5021, a lower rear arm rod 5022 and at least one coupling cross beam 5023. The coupling cross beam 5023 is coupled between the lower front arm rod 5021 and the lower rear arm rod 5022. A first end of the lower front arm rod 5021 (an end of the lower front arm rod 5021 adjacent to the frame 100 as illustrated in FIG. 1) is coupled to the frame 100 by a first lower front pivot 5024, and a second end of the lower front arm rod 5021 (an end of the lower front arm rod 5021 adjacent to the axle support 300 as illustrated in FIG. 1) is coupled to the axle support 300 by a second lower front pivot 5025. A first end of the lower rear arm rod 5022 (an end of the lower rear arm rod 5022 adjacent to the frame 100 as illustrated in FIG. 2) is coupled to the frame 100 by a first lower rear pivot 5026, and a second end of the lower rear arm rod 5022 (an end of the axle support 300 adjacent to the frame 100 as illustrated in FIG. 2) is coupled to the axle support 300 by a second lower rear pivot 5027.

In some embodiments, as illustrated in FIGS. 1, 2 and 6, a distance between the first end of the lower front arm rod 5021 and the first end of the lower rear arm rod 5022 is greater than a distance between the second end of the lower front arm rod 5021 and the second end of the lower rear arm rod 5022. Thus, stress on the lower control arm 502 can be reasonable, and the stability of the travelling of the all-terrain vehicle can be further improved.

In some embodiments, as illustrated in FIGS. 1 and 6, the first upper pivot 5012 is parallel to the longitudinal central symmetry plane of the all-terrain vehicle, and a distance between the first upper pivot 5012 and the longitudinal central symmetry plane of the all-terrain vehicle is A. An axis of the first lower front pivot 5024 and an axis of the first lower rear pivot 5026 coincide, and a distance from the first lower front pivot 5024 and the first lower rear pivot 5026 to the longitudinal central symmetry plane of the all-terrain vehicle is B. A is greater than B. It is found through researches that, when A is greater than B, change in camber and wheelbase during movement of the wheels of the all-terrain vehicle is small. Thus, track control of the wheels can be facilitated, the controllability of the all-terrain vehicle can be improved, and service life of the tires can be prolonged.

Further, an axis of the first upper pivot 5012 is parallel to the axis of the first lower front pivot 5024 and the axis of the first lower rear pivot 5026, and an included angle between a plane determined by the first upper pivot 5012, the first lower front pivot 5024 and the first lower rear pivot 5026 and the longitudinal central symmetry plane of the all-terrain vehicle is $\alpha$, and the $\alpha$ is greater than or equal to 2.5 degrees and less than or equal to 10 degrees. It is found through researches that, when A is greater than B, and 2.5 degrees$\leq\alpha\leq$10 degrees, change in camber and wheelbase during movement of the wheels of the all-terrain vehicle is further reduced. Thus, track control of the wheels can be further facilitated, the controllability of the all-terrain vehicle can be improved, and service life of the tires can be further prolonged.

In some embodiments, as illustrated in FIGS. 1 and 6, the second upper pivot 5014 is parallel to the longitudinal central symmetry plane of the all-terrain vehicle, a distance between the second upper pivot 5014 and the longitudinal central symmetry plane of the all-terrain vehicle is C, a distance between the second lower front pivot 5025 or the second lower rear pivot 5027 and the longitudinal central symmetry plane of the all-terrain vehicle is D, and C is less than or equal to D. It is found through researches that, when C is less than or equal to D, change in camber and wheelbase during movement of the wheels of the all-terrain vehicle is small. Thus, track control of the wheels can be facilitated, the controllability of the all-terrain vehicle can be improved, and service life of the tires can be prolonged.

Further, the axis of the second upper pivot 5014 is parallel to the axis of the second lower front pivot 5025 and the axis of the second lower rear pivot 5027, an included angle between a plane determined by the second upper pivot 5014 and the second lower front pivot 5025 or the second lower rear pivot 5027 and the longitudinal central symmetry plane of the all-terrain vehicle is $\beta$, and the $\beta$ is greater than or equal to 0 degrees and less than or equal to 5 degrees. It is found through researches that, when C is less than or equal to D, and $0\leq\beta\leq5$ degrees, change in camber and wheelbase during movement of the wheels of the all-terrain vehicle is further reduced. Thus, track control of the wheels can be further facilitated, the controllability of the all-terrain vehicle can be improved, and service life of the tires can be further prolonged.

In some embodiments, the upper control arm 501 further includes a first sub arm 5015, a second sub arm 5016 and a cross arm 5017. The coupling seat 5013 is arranged on the cross arm 5017. A first end of the first sub arm 5015 and a first end of the second sub arm 5016 are coupled to a side wall of the coupling pipe 5011, a second end of the first sub arm 5015 is coupled to a first end of the cross arm 5017, a second end of the second sub arm 5016 is coupled to a second end of the cross arm 5017, and the first sub arm 5015, the second sub arm 5016, the cross arm 5017 and the coupling pipe 5011 cooperatively enclose a closed cavity. It could be understood that, the first sub arm 5015, the cross arm 5017, the second sub arm 5016 and the coupling pipe 5011 are coupled end to end to enclose a closed frame structure, to enhance coupling strength of the upper control arm 501, and facilitate improvement of the stability of the upper control arm 501 during movement.

In some embodiments, as illustrated in FIG. 5, the cross alias 5017 is integrally formed with the first sub arm 5015 and/or the second sub arm 5016. For example, the cross arm

5017 is integrally formed with the first sub arm 5015; or, the cross arm 5017 is integrally formed with the second sub arm 5016; or, the cross arm 5017, the first sub arm 5015 and the second sub arm 5016 are integrally formed. In an embodiment, each of the cross arm 5017, the first sub arm 5015 and the second sub arm 5016 is a pipe, and the cross arm 5017 is integrally formed with the first sub arm 5015, and the cross arm 5017 is coupled to the second sub arm 5016 by welding, to improve coupling strength of the upper control arm 501, and facilitate machining and manufacturing of the upper control arm 501.

Further, as illustrated in FIG. 5, a distance between a middle portion of the first sub arm 5015 and a middle portion of the second sub arm 5016 is greater than a distance between the first end of the first sub arm 5015 and the first end of the second sub arm 5016; and a distance between a middle portion of the first sub arm 5015 and a middle portion of the second sub arm 5016 is greater than a distance between the second end of the first sub arm 5015 and the second end of the second sub arm 5016. It could be understood that, the closed cavity enclosed by the first sub arm 5015 and the second sub arm 5016 has a substantially rhombus shape. That is, a width of a middle segment of the upper control arm 501 is greater than widths of end portions of the upper control arm 501, and thus the structure of the upper control arm 501 can be optimized, to enhance strength of the upper control arm 501, make the stress on the upper control arm 501 more reasonable, and improve stability of the upper control arm 501 during movement.

In some embodiments, as illustrated in FIG. 5, the upper control arm 501 further includes a reinforcing plate 5018. The reinforcing plates 5018 are arranged between the first end of the first sub arm 5015 and the first end of the second sub arm 5016 and between the second end of the first sub arm 5015 and the second end of the second sub arm 5016, and the reinforcing plate 5018 defines a lightening hole 50181, to lighten weight of the upper control arm 501. It could be understood that, the reinforcing plate 5018 is coupled to the first sub arm 5015 and the second sub arm 5016 at the same time, to enhance coupling strength of end portions of the first sub arm 5015 and the second sub atm 5016, make the stress on the upper control arm 501 more reasonable, and prolong the service life of the upper control arm 501.

An all-terrain vehicle according to embodiments of the present disclosure includes a frame 100, a stabilization rod mounting member 800, a transmission 200, an axle support 300, a driving shaft 400 and a rear suspension assembly 500. The stabilization rod mounting member 800 is mounted to a rear portion of the frame 100, the transmission 200 is mounted on the frame 100, and the driving shaft 400 is coupled between the transmission 200 and the axle support 300. The rear suspension assembly 500 includes a left rear suspension subassembly 510 and a right rear suspension subassembly 520. The left rear suspension subassembly 510 and the right rear suspension subassembly 520 are symmetrically arranged at left and right sides of the frame 100.

Each of the left rear suspension subassembly 510 and the right rear suspension subassembly 520 includes an upper control arm 501, a lower control arm 502 and a first upper pivot 5012. A first end of the upper control arm 501 (an end of the upper control arm 501 adjacent to the frame 100 as illustrated in FIG. 3) is pivotally coupled to the frame 100. A second end of the upper control arm 501 (an end of the upper control arm 501 adjacent to the axle support 300 as illustrated in FIG. 3) is pivotally coupled to the axle support 300. A first end of the lower control arm 502 (an end of the lower control arm 502 adjacent to the frame 100 as illustrated in FIG. 3) is pivotally coupled to the frame 100. A second end of the lower control arm 502 (an end of the lower control arm 502 adjacent to the axle support 300 as illustrated in FIG. 3) is pivotally coupled to the axle support 300. A junction of the first end of the upper control arm 501 and the frame 100 is located behind the driving shaft 400, the first upper pivot 5012 passes through an upper portion of the stabilization rod mounting member 800, the frame 100 and the first end of the upper control arm 501, to couple the upper portion of the stabilization rod mounting member 800 to the frame 100, and pivotally couple the first end of the upper control arm 501 to the frame 100.

In the all-terrain vehicle according to embodiments of the present disclosure, the junction of the end of the upper control arm 501 adjacent to the frame 100 and the frame 100 is located behind the driving shaft 400, thus compactness of the structure of the all-terrain vehicle can be improved, the utilization of internal space of the all-terrain vehicle can be improved, and optimization of suspension parameters of the all-terrain vehicle can be facilitated; the upper portion of the stabilization rod mounting member 800 is coupled to the frame 100 by the first upper pivot 5012, and the first end of the upper control arm 501 is pivotally coupled to the frame 100, thus, use of parts and components is reduced, manufacturing costs of the all-terrain vehicle are reduced, and assembly of the all-terrain vehicle is facilitated; and furthermore, the first upper pivot is coupled to the frame 100, the upper control arm 501 and the stabilization rod mounting member 800 at the same time, thus the internal space of the all-terrain vehicle is saved, a mounting size of the all-terrain vehicle is reduced, and the all-terrain vehicle has a compact structure and good stability.

Further, as illustrated in FIGS. 1 to 6, the lower control arm 502 includes a lower front arm rod 5021 and a lower rear arm rod 5022. A first end of the lower front arm rod 5021 (an end of the lower front arm rod 5021 adjacent to the frame 100 as illustrated in FIG. 1) is pivotally coupled to the frame 100, and a second end of the lower front arm rod 5021 (an end of the lower front arm rod 5021 adjacent to the axle support 300 as illustrated in FIG. 1) is pivotally coupled to the axle support 300. A first end of the lower rear arm rod 5022 (an end of the lower rear arm rod 5022 adjacent to the frame 100 as illustrated in FIG. 2) is pivotally coupled to the frame 100, and a second end of the lower rear arm rod 5022 (an end of the lower rear arm rod 5022 adjacent to the axle support 300 as illustrated in FIG. 2) is pivotally coupled to the axle support 300.

Figure 4:
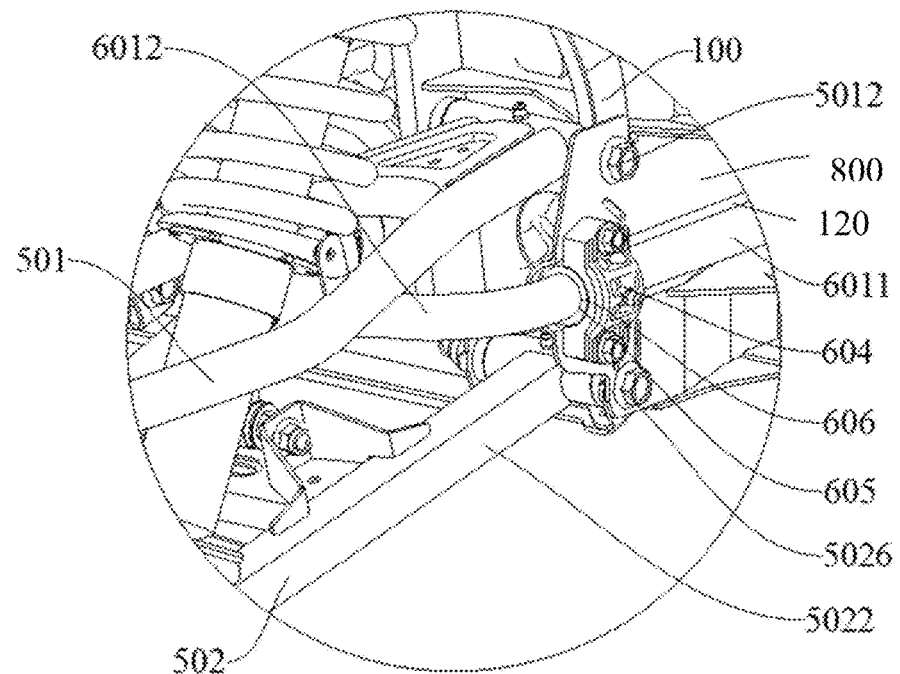
FIG. 4 is a partially enlarged view of a region A in FIG. 2.

As illustrated in FIG. 4, the rear suspension assembly 500 also includes a first lower rear pivot 5026. The first lower rear pivot 5026 passes through a lower portion of the stabilization rod mounting member 800, the frame 100 and the first end of the lower front arm rod 5021, to couple the lower portion of the stabilization rod mourning member 800 to the frame 100, and pivotally couple the first end of the lower rear arm rod 5022 to the frame 100. Thus, the all-terrain vehicle according to embodiments of the present disclosure can further reduce use of parts and components, and reduce the manufacturing costs of the all-terrain vehicle. Additionally, the first lower rear pivot 5026 is coupled to the frame 100, the lower rear arm rod 5022 and the stabilization rod mounting member 800 at the same time, to further save the internal space of the all-terrain vehicle, reduce the mounting size of the all-terrain vehicle, and make the all-terrain vehicle have a compact structure.

In some embodiments, as illustrated in FIGS. 1 to 6, the all-terrain vehicle further includes a stabilization assembly

600. The stabilization assembly 600 includes a stabilization rod 601, and the stabilization rod 601 includes a cross rod 6011 and a first longitudinal rod 6012 and a second longitudinal rod 6013 located at two sides of the cross rod 6011. The first longitudinal rod 6012 and the second longitudinal rod 6013 are coupled to the cross rod 6011. In some embodiments, the cross rod 6011, the first longitudinal rod 6012 and the second longitudinal rod 6013 are integrally formed.

As illustrated in FIG. 6, the cross rod 6011 is mounted on the stabilization rod mounting member 800, the first longitudinal rod 6012 is located between the upper control arm 501 and the lower control arm 502 of the left rear suspension subassembly 510 and a free end of the first longitudinal rod 6012 is hinged to the lower control arm 502, and the second longitudinal rod 6013 is located between the upper control arm 501 and the lower control arm 502 of the right rear suspension subassembly 520 and a free end of the second longitudinal rod 6013 is hinged to the lower control arm 502. It could be understood that, shake amplitude of the lower control arm 502 can be reduced due to drag effect of the stabilization assembly 600 during movement of the lower control arm 502, to reduce probability of roll of the all-terrain vehicle, and enhance stability of the all-terrain vehicle.

In some embodiments, as illustrated in FIGS. 4 and 6, the stabilization rod mounting member 800 defines a mounting groove 120, a length direction of the mounting groove 120 is substantially orthogonal to the longitudinal central symmetry plane of the all-terrain vehicle, and the cross rod 6011 is fitted in the mounting groove 120. Since the cross rod 6011 is fitted in the mounting groove 120, the movement of the cross rod 6011 in an up-down direction can be limited by the mounting groove 120, and position of the cross rod 6011 can be limited, to improve stability of the cross rod 6011 in operation. Additionally, the all-terrain vehicle according to embodiments of the present disclosure is provided with the mounting groove 120 to accommodate the cross rod 6011, the mounting size of the all-terrain vehicle is reduced to some extent, and the all-terrain vehicle has more compact structure.

In at least one embodiment, as illustrated in FIG. 4, the stabilization assembly 600 also includes a fixed seat 604 and a sleeve 606. The fixed seat 604 is coupled to the stabilization rod mounting member 800, the fixed seat 604 and the mounting groove 120 enclose a limit cavity 605, the sleeve 606 is fitted over the cross rod 6011, and the sleeve 606 is arranged in the limit cavity 605. The all-terrain vehicle according to embodiments of the present disclosure facilitates rotation of the cross rod 6011 by providing the sleeve 606. When assembling the stabilization assembly 600, the cross rod 6011 fitted with the sleeve 606 is placed in the mounting groove 120, the fixed seat 604 is mounted onto the frame 100, and then the fixed seat 604 and the mounting groove 120 enclose the limit cavity 605 to limit axial movement of the cross rod 6011.

In some embodiments, as illustrated in FIGS. 4 and 6, a plurality of fixed seats 604 are provided, and the plurality of fixed seats 604 are spaced apart along a length direction of the mounting groove 120. For example, two fixed seats 604 are provided, and the two fixed seats 604 are arranged at left and right sides of the frame 100 along the length direction of the mounting groove 120.

In some other embodiments, a rear end of the stabilization rod mounting member 800 defines a mounting hole (not illustrated), a length direction of the mounting hole is substantially orthogonal to the central symmetry plane of the all-terrain vehicle, and the cross rod 6011 is fitted in the mounting hole. Since the cross rod 6011 is fitted in the mounting hole, the movement of the cross rod 6011 in the up-down direction can be limited by the mounting hole, and the position of the cross rod 6011 can be limited, to improve stability of the cross rod 6011 in operation. Additionally, the all-terrain vehicle according to embodiments of the present disclosure is provided with the mounting hole to accommodate the cross rod 6011, the mounting size of the all-terrain vehicle is reduced to some extent, and the all-terrain vehicle has more compact structure.

In some embodiments, as illustrated in FIGS. 2 to 6, the stabilization assembly 600 also includes a first coupling rod 602 and a second coupling rod 603. The first coupling rod 602 is hinged between a free segment of the first longitudinal rod 6012 and the lower control arm 502 of the left rear suspension subassembly 510, and the second coupling rod 603 is hinged between a free segment of the second longitudinal rod 6013 and the lower control arm 502 of the right rear suspension subassembly 520. Thus, the all-terrain vehicle according to embodiments of the present disclosure can increase degree of freedom of the stabilization assembly 600 by the hinged first coupling rod 602 and second coupling rod 603, to improve applicability of the stabilization assembly 600.

Further, as illustrated in FIGS. 1 and 6, the first coupling rod 602 and the second coupling rod 603 are arranged behind the driving shaft 400, compactness of structure of the all-terrain vehicle can be improved, utilization of the internal space of the all-terrain vehicle can be improved, and optimization of the suspension parameters of the all-terrain vehicle can be facilitated.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative tennis are for convenience of description and do not require that the present disclosure be constructed or operated in a particular orientation.

In addition, terms such as "first" and "second" are used herein for purposes of description and are not intended to indicate or imply relative importance or significance. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements. The above terms can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on,"

"above," or "on top of" a second feature may include an embodiment in which the first feature is right or obliquely "on," "above," or "on top of" the second feature, or just means that the first feature is at a height higher than that of the second feature. While a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout the present disclosure to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without conflicting, various embodiments or examples or features of various embodiments or examples described in the present specification may be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An all-terrain vehicle, comprising:
a frame;
a transmission mounted on the frame;
an axle support;
a driving shaft coupled between the transmission and the axle support; and
a rear suspension assembly comprising a left rear suspension subassembly and a right rear suspension subassembly symmetrically arranged at left and right sides of the frame, each of the left rear suspension subassembly and the right rear suspension subassembly comprising an upper control arm and a lower control arm, the upper control arm having a first end pivotally coupled to the frame and a second end pivotally coupled to the axle support, the lower control arm having a first end pivotally coupled to the frame and a second end pivotally coupled to the axle support, a junction of the first end of the upper control arm and the frame being located behind the driving shaft, the first end of the upper control arm being pivotally coupled to the frame by a single first upper pivot;
an included angle between a plane determined by the first upper pivot and a first lower front pivot or a first lower rear pivot and a longitudinal central symmetry plane of the all-terrain vehicle is α, and the α is greater than or equal to 2.5 degrees and less than or equal to 10 degrees;
the second end of the upper control arm is pivotally coupled to the axle support by a second upper pivot, the second upper pivot is parallel to the longitudinal central symmetry plane of the all-terrain vehicle, a distance between the second upper pivot and the longitudinal central symmetry plane of the all-terrain vehicle is C, a distance between a second lower front pivot or a second lower rear pivot and the longitudinal central symmetry plane of the all-terrain vehicle is D, and C is less than D.

2. The all-terrain vehicle according to claim 1, wherein the first upper pivot has a front end located behind the driving shaft and a rear end located behind the transmission.

3. The all-terrain vehicle according to claim 2, wherein the first upper pivot has an axis parallel to a longitudinal central symmetry plane of the all-terrain vehicle.

4. The all-terrain vehicle according to claim 2, wherein the first end of the upper control arm has a coupling pipe, the first upper pivot is pivotally fitted in the coupling pipe, the front end of the first upper pivot extends out from the coupling pipe and is coupled to the frame, and the rear end of the first upper pivot extends out from the coupling pipe and is coupled to the frame.

5. The all-terrain vehicle according to claim 4, wherein a rear portion of the frame is coupled with a rear vertical beam, and the first end of the upper control arm is coupled to the rear vertical beam by the first upper pivot.

6. The all-terrain vehicle according to claim 5, wherein the rear vertical beam comprises a front side flange and a rear side flange, and the front end of the first upper pivot passes through the front side flange and the rear side flange and is fitted with a fastening nut.

7. The all-terrain vehicle according to claim 4, wherein the upper control arm comprises a first sub arm, a second sub arm and a cross arm, the cross arm is pivotally coupled to the axle support; and
a first end of the first sub arm and a first end of the second sub arm are coupled to a side wall of the coupling pipe, a second end of the first sub arm is coupled to a first end of the cross arm, a second end of the second sub arm is coupled to a second end of the cross arm, and the first sub arm, the second sub arm, the cross arm and the coupling pipe cooperatively enclose a closed cavity.

8. The all-terrain vehicle according to claim 7, wherein a distance between a middle portion of the first sub arm and a middle portion of the second sub arm is greater than:
a distance between the first end of the first sub arm and the first end of the second sub arm; and
a distance between the second end of the first sub arm and the second end of the second sub arm.

9. The all-terrain vehicle according to claim 8, wherein the upper control arm further comprises a reinforcing plate, the reinforcing plate is arranged at least one of:
between the first end of the first sub arm and the first end of the second sub arm; and
between the second end of the first sub arm and the second end of the second sub arm.

10. The all-terrain vehicle according to claim 1, wherein the lower control arm comprises a lower front arm rod, a lower rear arm rod and at least one coupling cross beam coupled between the lower front arm rod and the lower rear arm rod;
the lower front arm rod has a first end coupled to the frame by a first lower front pivot and a second end coupled to the axle support by a second lower front pivot;
the lower rear arm rod has a first end coupled to the frame by a first lower rear pivot and a second end coupled to the axle support by a second lower rear pivot; and
the first lower front pivot is coaxial with the first lower rear pivot and parallel to a longitudinal central symmetry plane of the all-terrain vehicle.

11. The all-terrain vehicle according to claim 10, wherein a distance between the first end of the lower front arm rod and the first end of the lower rear arm rod is greater than a distance between the second end of the lower front arm rod and the second end of the lower rear arm rod.

12. The all-terrain vehicle according to claim 11, wherein the first end of the upper control arm is pivotally coupled to the frame by the first upper pivot, the first upper pivot is parallel to the longitudinal central symmetry plane of the all-terrain vehicle, a distance between the first upper pivot and the longitudinal central symmetry plane of the all-terrain vehicle is A, a distance between the first lower front pivot or the first lower rear pivot and the longitudinal central symmetry plane of the all-terrain vehicle is B, and A is greater than B.

13. The all-terrain vehicle according to claim 10 wherein an included angle between a plane determined by the second upper pivot and the second lower front pivot or the second lower rear pivot and the longitudinal central symmetry plane of the all-terrain vehicle is $\beta$, and the $\beta$ is greater than 0 degrees and less than or equal to 5 degrees.

14. An all-terrain vehicle, comprising:
a frame;
a stabilization rod mounting member mounted to a rear portion of the frame;
a transmission mounted on the frame;
an axle support;
a driving shaft coupled between the transmission and the axle support; and
a rear suspension assembly comprising a left rear suspension subassembly and a right rear suspension subassembly symmetrically arranged at left and right sides of the frame, each of the left rear suspension subassembly and the right rear suspension subassembly comprising an upper control arm, a lower control arm and a first upper pivot, the upper control arm having a first end pivotally coupled to the frame and a second end pivotally coupled to the axle support, the lower control arm having a first end pivotally coupled to the frame and a second end pivotally coupled to the axle support, a junction of the first end of the upper control arm and the frame being located behind the driving shaft,
wherein the first upper pivot passes through an upper portion of the stabilization rod mounting member, the frame and the first end of the upper control arm, to couple the upper portion of the stabilization rod mounting member to the frame and pivotally couple the first end of the upper control arm to the frame,
further comprising a stabilization assembly comprising a stabilization rod, the stabilization rod comprising a cross rod and a first longitudinal rod and a second longitudinal rod located at two sides of the cross rod and coupled to the cross rod, the cross rod being mounted on the stabilization rod mounting member, the first longitudinal rod being located between the upper control arm and the lower control arm of the left rear suspension subassembly and having a free end hinged to the lower control arm, the second longitudinal rod being located between the upper control arm and the lower control arm of the right rear suspension subassembly and having a free end hinged to the lower control arm.

15. The all-terrain vehicle according to claim 14, wherein the lower control arm comprises a lower front arm rod and a lower rear arm rod;
the lower front arm rod has a first end pivotally coupled to the frame and a second end pivotally coupled to the axle support;
the lower rear arm rod has a first end pivotally coupled to the frame and a second end pivotally coupled to the axle support; and
the rear suspension assembly further comprises a first lower rear pivot passing through a lower portion of the stabilization rod mounting member, the frame and the first end of the lower rear arm rod, to couple the lower portion of the stabilization rod mounting member to the frame and pivotally couple the first end of the lower rear arm rod to the frame.

16. The all-terrain vehicle according to claim 14, wherein the stabilization rod mounting member defines a mounting groove, and the cross rod is fitted in the mounting groove.

17. The all-terrain vehicle according to claim 16, wherein the stabilization assembly further comprises a fixed seat coupled to the stabilization rod mounting member, the fixed seat and the mounting groove enclose a limit cavity, and the cross rod is fitted in the limit cavity.

* * * * *